Figure 1:
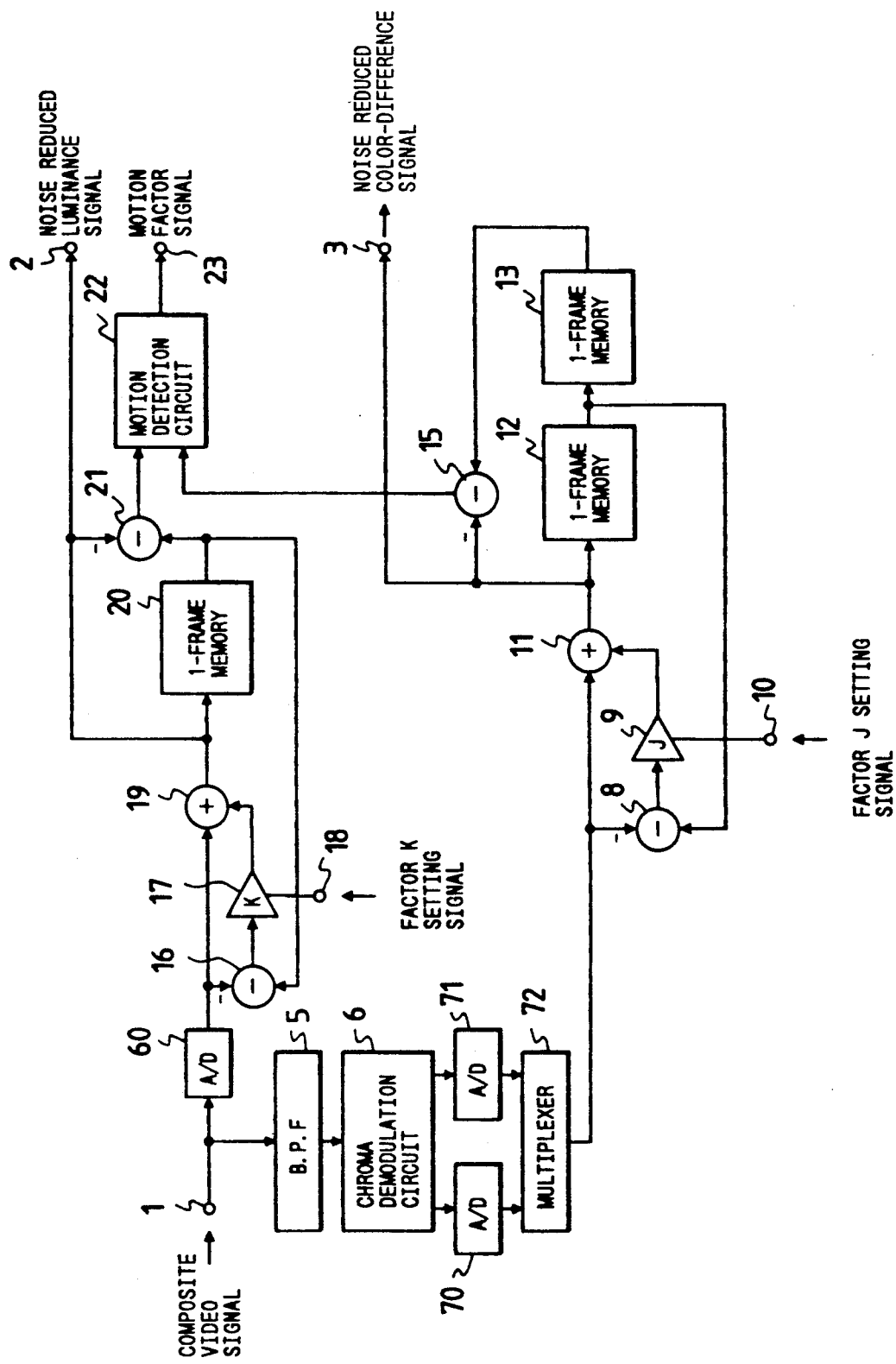
Figure 2:
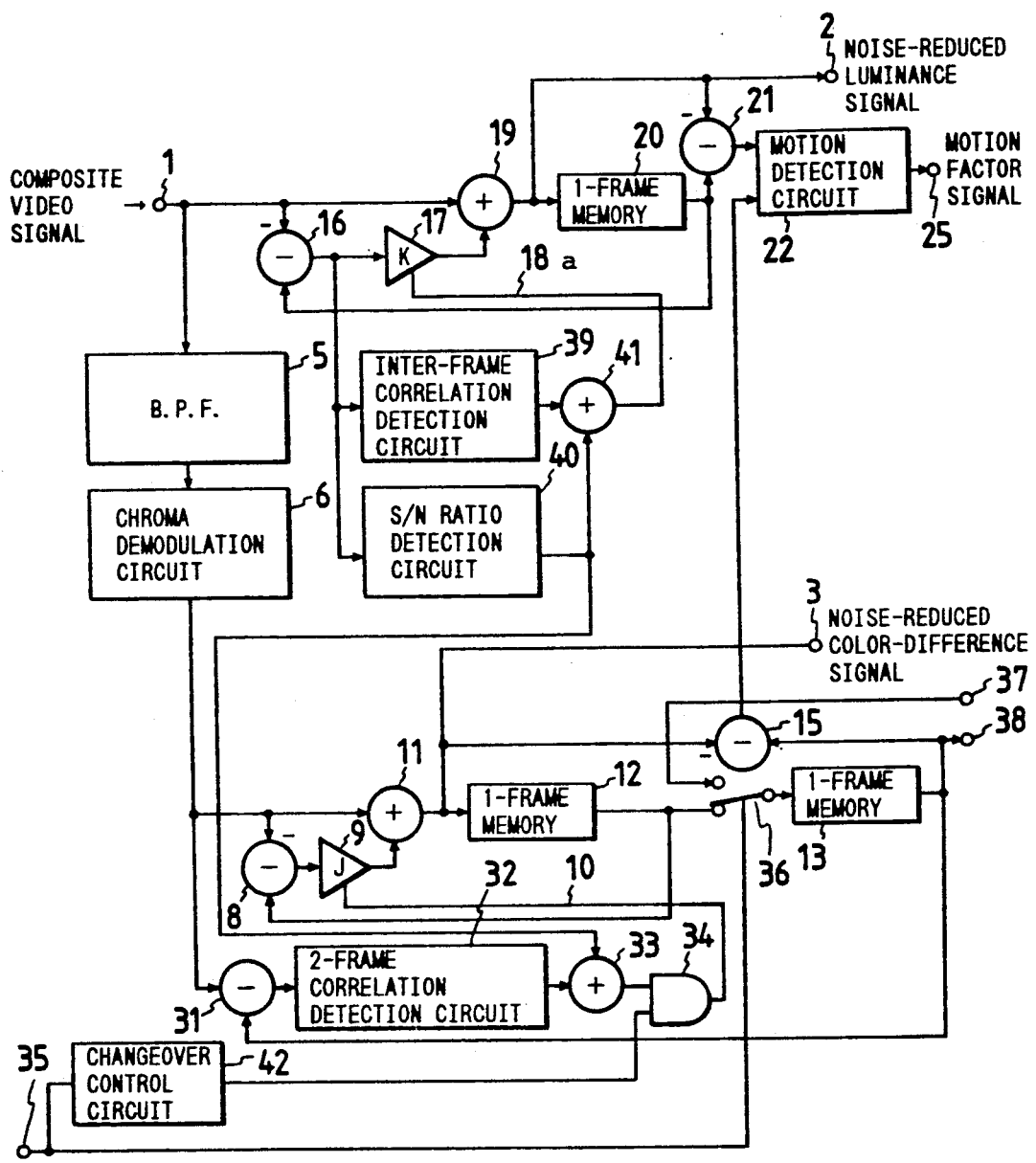
Figure 3:
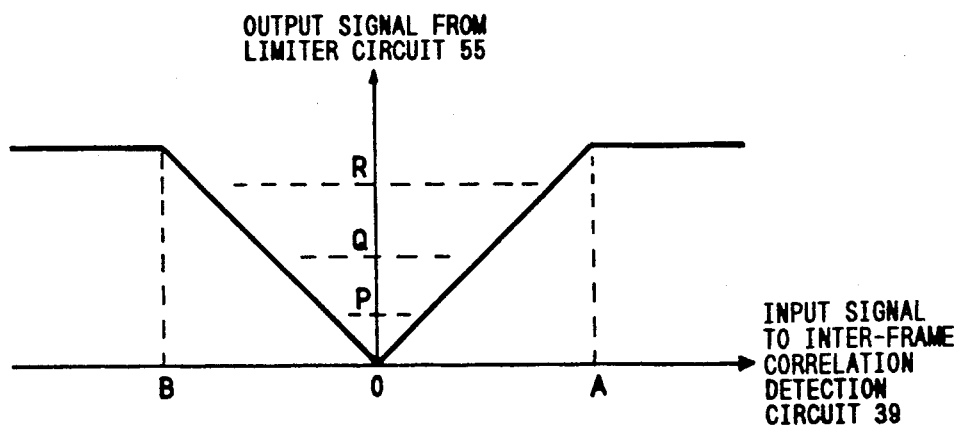
Figure 4:
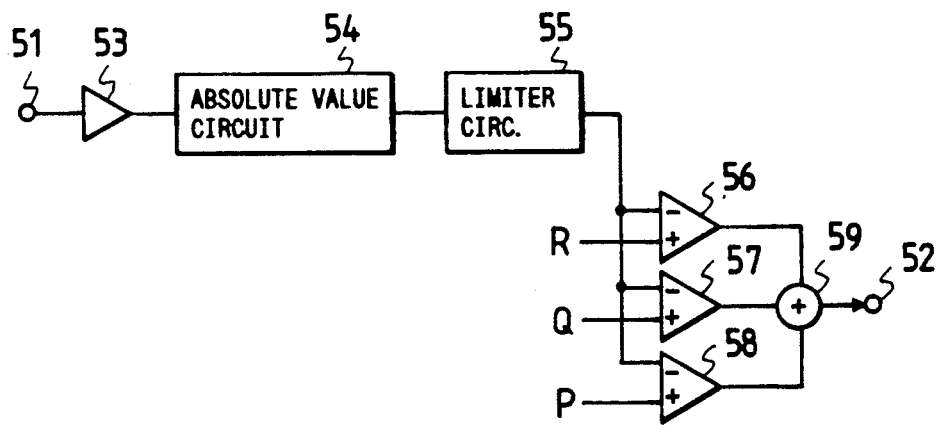
Figure 5:
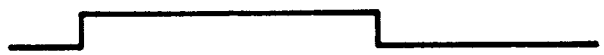
Figure 5:
Figure 6:
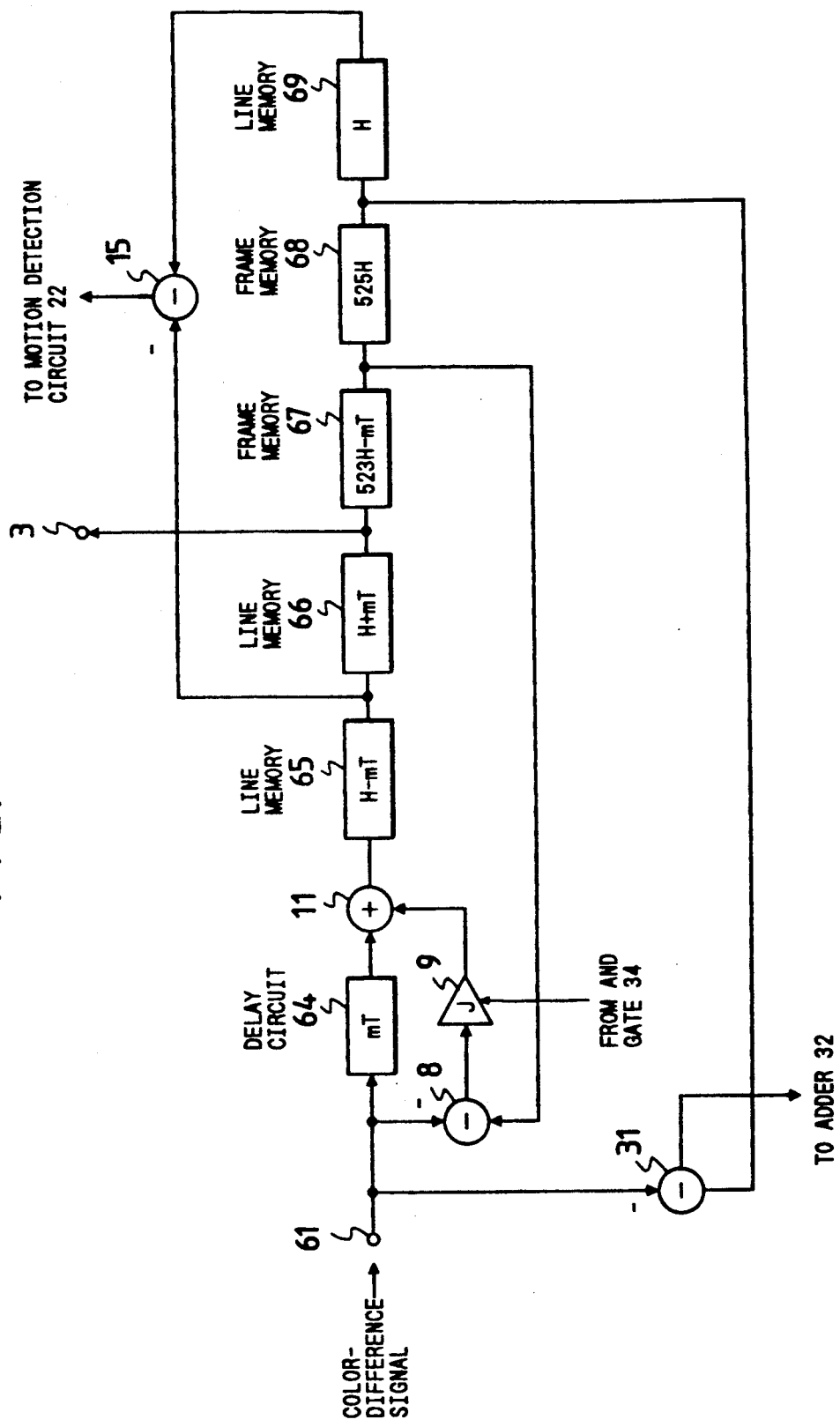

United States Patent [19]

Hamanaka et al.

[11] Patent Number: 5,187,224

[45] Date of Patent: Feb. 16, 1993

[54] THERMOPLASTIC ELASTOMER COMPOSITION WHICH HAS A SHORE A HARDNESS OF LESS THAN 45

[75] Inventors: Tatsuo Hamanaka; Tadashi Hikasa; Koichiro Ibuki, all of Chiba, Japan

[73] Assignee: Sumitomo Chemical Company, Limited, Osaka, Japan

[21] Appl. No.: 692,456

[22] Filed: Apr. 8, 1991

[30] Foreign Application Priority Data

Apr. 9, 1990 [JP] Japan ................................ 2-94485

[51] Int. Cl.$^5$ ..................... C08J 3/24; C08K 5/14; C08L 53/00
[52] U.S. Cl. ................. 524/505; 524/484; 524/485; 524/486; 525/98; 525/99
[58] Field of Search ............... 524/505, 484, 485, 486; 525/98, 99

[56] References Cited

U.S. PATENT DOCUMENTS

| | | | |
|---|---|---|---|
| 31,518 | 2/1974 | Fischer | 525/194 |
| 3,806,558 | 4/1974 | Fischer | 260/897 A |
| 3,830,767 | 8/1974 | Condon | 260/285 B |
| 4,006,116 | 2/1977 | Dominguez | 260/33.6 AQ |
| 4,687,804 | 8/1987 | Shiraishi et al. | 524/505 |

FOREIGN PATENT DOCUMENTS

| | | |
|---|---|---|
| 318814 | 6/1989 | European Pat. Off. |
| 298739 | 11/1989 | European Pat. Off. |
| 50-14742 | 2/1975 | Japan |
| 52-65551 | 5/1977 | Japan |
| 59-6236 | 1/1984 | Japan |
| 62-81443 | 4/1987 | Japan |

OTHER PUBLICATIONS

Tanka et al., Chemical Abstracts, Elastomers, vol. III, No. 2, 10 Jul., 1989, p. 71.
Database WPIL, No. 84–05631, Derwent Publications Ltd., London, GB: & JP-A-59 006236 (Mitsubishi Peroch Co., Ltd) Jan. 13, 1984.
Database WPIL, No. 87–141001, Derwent Publications Ltd., London GB: & JP-A-62 081 443 (Sumitomo Chem. Ind. Co., Ltd) Apr. 14, 1987.

*Primary Examiner*—Paul R. Michl
*Assistant Examiner*—U. K. Rajguru
*Attorney, Agent, or Firm*—Cushman, Darby & Cushman

[57] ABSTRACT

A blend which comprises a partially crosslinked product of a mixture of an oil-extended olefinic copolymer rubber comprising an olefinic copolymer rubber having a 100° C. Mooney viscosity 150–350, a polyolefin resin, a selectively hydrogenated block copolymer, and a specific mineral oil type softening agent has excellent flexibility of less than 45 in Shore A hardness. The blend is not tacky, nor does the softening agent bleed. An anti-static agent for polyolefins and/or a higher fatty acid amide may be included in the composition.

6 Claims, 4 Drawing Sheets

THERMOPLASTIC ELASTOMER COMPOSITION WHICH HAS A SHORE A HARDNESS OF LESS THAN 45

The present invention relates to a thermoplastic elastomer composition. More particularly, it relates to a thermoplastic elastomer composition which has excellent flexibility of less than 45 in Shore A hardness, has no problems such as tackiness and bleeding of softening agent and further is excellent in mechanical strength, heat resistance, rubber elasticity and processability.

Uses of thermoplastic elastomers (hereinafter referred to as "TPE") have been developed in the wide fields such as automobile parts, appliance parts, sundries, etc. utilizing their characteristics that vulcanization step is not needed and they can be processed by molding machines for usual thermoplastic resins.

Recently, materials higher in flexibility are preferred for parts which people directly touch because of superiority in hand. Hitherto, although there are various kinds of TPE, various problems have occurred when it is attempted to obtain those which are very high in flexibility of less than 45 in Shore A hardness.

For example, olefinic TPE compositions were known in Japanese Patent Kokai No. 48-26838, but the inventors further proposed compositions improved in balance of flexibility, mechanical strengths and permanent compression set using olefinic copolymer rubbers having a 100° C. Mooney viscosity ($ML_{1+4}$ 100° C.) of 150-350 (Japanese Patent Kokai No. 1-10369).

However, this method has also the problem that appearance of molded products deteriorates when highly flexible compositions of less than 45 in Shore A hardness are to be obtained.

On the other hand, as styrene TPE compositions, those which comprise hydrogenated block copolymers, polyolefin resins and mineral oil type softening agents were known in Japanese Patent Kokai Nos. 50-1472 and 52-6551. These compositions have good rubber elasticity at room temperature and are also good in processability. By further increasing amount of softening agent, those which are very flexible with Shore A hardness of less than 45 can also be obtained.

However, the above compositions also have the defects that increase in the amount of softening agent causes bleeding of the softening agent and furthermore, tackiness of the surface of molded products deteriorates.

For improvement of tack bonding of pellets which is the similar problem to the tackiness of molded products, the inventors proposed a method of adding higher fatty acid amide in Japanese Patent Kokai No. 62-81443. However, this method also has the problems that in the case of compositions of less than 45 in Shore A hardness with high content of softening agent, the tacky touch decreases, but bleeding of the softening agent occurs in the molded products.

Furthermore, blends of the above olefinic TPE with the styrene type TPE represented by blend of hydrogenated block copolymer were known in Japanese Patent Kokai No. 59-6236.

The blends are obtained by the method characterized in that among respective components such as hydrogenated block copolymer and peroxide crosslinking type olefinic copolymer rubber, non-aromatic softening agent for rubber, and peroxide decomposition type olefinic resin, first at least the total amount of the peroxide crosslinking type olefinic copolymer among said components excluding the hydrogenated block copolymer is heat treated in the presence of an organic peroxide to carry out partial crosslinking and then, the resulting partially crosslinked product is blended with the hydrogenated block copolymer and the remainder components.

The above patent kokai specification refers to a Mooney viscosity ($ML_{1+4}$ 100° C.) of 10-120 of the rubber used as peroxide crosslinking type olefinic copolymer rubber. Furthermore, the specification mentions that the resulting composition is high in flexibility and excellent in heat distortion resistance, mechanical strength and processability and although it is not necessarily reported that tackiness can be improved, the inventors prepared a composition of less than 45 in Shore A hardness by the method mentioned therein using the rubber having the Mooney viscosity of the above range, but molded product made from the composition had tackiness and was not preferred.

Under the circumstances, the task is to solve the problems that molded products made from very flexible TPE of less than 45 in Shore A hardness have tackiness and bleeding of softening agent occurs in the molded products.

Even if the actually obtained molded products have no special defects in processability and mechanical strengths, they are inferior in touch and the surface is stained due to sticking of dusts. Thus, there are problems in their use.

Such defects can be improved by painting, but coat is required to be very flexible and increase in cost is caused owing to coating treatment. This is not preferred in practical use.

The object of the present invention is to provide TPE materials which are very flexible, namely, less than 45 in Shore A hardness, are free from the problems such as tackiness and bleeding of softening agent and besides are excellent in mechanical strength, heat resistance, rubber elasticity and processability.

As a result of intensive research conducted by the inventors, it has been found that a blend which comprises a partially crosslinked product of a mixture of an olefinic copolymer rubber and a polyolefin resin, a hydrogenated block copolymer, and a mineral oil type softening agent has a very high flexibility of less than 45 in Shore A hardness and is free from problems such as tackiness and bleeding of softening agent when an oil-extended olefinic copolymer rubber comprising an olefinic copolymer rubber having a specific Mooney viscosity and a specific mineral oil type softening agent is used as said olefinic copolymer rubber and besides, an antistatic agent for polyolefins and/or a higher fatty acid amide. Thus, the present invention has been accomplished.

That is, the present invention relates to a thermoplastic elastomer composition which has a Shore A hardness of less than 45 and comprises:

(a) 100 parts by weight of a selectively hydrogenated block copolymer which has a structure having at least two terminal polymer blocks A comprising an aromatic monoalkenyl or monoalkenylidene hydrocarbon polymer of 5,000-125,000 in number average molecular weight and at least one intermediate polymer block B comprising a partially or completely hydrogenated aliphatic conjugated diene hydrocarbon polymer of 10,000-800,000 in number average molecular weight, (b) 50-400 parts by weight of an oil-extended olefinic copolymer rubber comprising 100 parts by weight of an olefinic copolymer rubber having a 100° C. Mooney viscosity ($ML_{1+4}$ 100° C.) of 150-350 and 20-150 parts by weight of a mineral oil type softening agent, (c) 2-100 parts by weight of a polyolefin resin, and (d) 50-350 parts by weight of a mineral oil type softening agent, said composition being prepared by heat treating a mixture of at least a total amount of the component (b) and a part or a total amount of the component (c) among the components (b)-(d) in the presence of an organic peroxide to partially crosslink the mixture and then, blending the resulting partially crosslinked product with the component (a) and the remainder components.

The present invention further relates to a thermoplastic elastomer composition which comprises 100 parts by weight of the above-mentioned thermoplastic elastomer composition to which are further added (e) 0.03-2 parts by weight of an antistatic agent for polyolefins and/or (f) 0.03-2 parts by weight of a higher fatty acid amide.

The present invention is specifically explained below.

(i) The monomers which constitute the aromatic monoalkenyl or monoalkenylidene hydrocarbon polymer block A in the hydrogenated block copolymer (a) include, for example, styrene, α-methylstyrene and tert-butylstyrene and the monomers which constitute the aliphatic conjugated diene hydrocarbon polymer block B in (a) include, for example, butadiene and isoprene.

Typical example of such hydrogenated block copolymers is one which has styrene-ethylene butylenestyrene structure and is called SEBS and is sold under the trademark of "KRATON-G" from Shell Chemical Co. in U.S.A.

(ii) The olefinic copolymer rubbers used in the oil-extended olefinic copolymer rubber (b) include, for example, amorphous random and elastomeric copolymers mainly composed of olefins such as ethylene-propylene copolymer rubber, ethylene-propylene-non-conjugated diene rubber, ethylene-butene-non-conjugated diene rubber, and propylene-butadiene copolymer rubber. Among them, ethylene-propylene-non-conjugated diene rubber is especially preferred. The non-conjugated dienes include, for example, dicyclopentadiene, 1,4-hexadiene, cyclooctadiene, methylenenorbornene and ethylidenenorbornene. Ethylidenenorbornene is especially preferred.

More specific examples are ethylene-propylene-ethylidenenorbornene copolymer rubbers (hereinafter referred to as "EPDM") containing 10-55% by weight, preferably 20-40% by weight of propylene and 1-30% by weight, preferably 3-20% by weight of ethylidenenorbornene and having a 100° C. Mooney viscosity ($ML_{1+4}$ 100° C.) of 150-350, preferably 170-300.

If propylene content is less than 10% by weight, flexibility is lost and if it is more than 55% by weight, mechanical properties deteriorate. If ethylidenenorbornene content is less than 1% by weight, mechanical properties deteriorate and if it is more than 30% by weight, injection moldability deteriorates.

If 100° C. Mooney viscosity ($ML_{1+4}$ 100° C.) is less than 150, tackiness of the final molded products becomes inferior.

When EPDM having a Mooney viscosity of 150-350 is used, tackiness is improved and mechanical properties are also improved. The EPDM may be those which are prepared by known method.

(iii) The mineral oil type softening agents used in the oil-extended olefinic copolymer rubbers are petroleum fractions of high boiling point which are added for improvement processability or mechanical properties and which include paraffinic, naphthenic and aromatic ones. Paraffinic petroleum fraction is especially preferred. When content of aromatic component increases, staining occurs much and this restricts the uses for obtaining transparent or light-colored products.

(iv) The oil-extended olefinic copolymer rubbers (b) contain the mineral oil type softening agent in an amount of 20-150 parts by weight, preferably 30-120 parts by weight for 100 parts by weight of olefinic copolymer rubber. If content of the softening agent is less than 20 parts by weight, it is necessary for obtaining compositions of less than 45 in Shore A hardness to add the mineral oil type softening agent (d) in a large amount in the subsequent step. This results in inferior tackiness.

On the other hand, if content of the mineral oil type softening agent is more than 150 parts by weight, plasticity much increases and even after partial crosslinking, the products bond to each other resulting in difficulty in handling.

Oil extension of the olefinic copolymer rubber is carried out by known methods, for example, a method of mechanically kneading the olefinic copolymer rubber and the mineral oil type softening agent using apparatuses such as roll and Banbury mixer and a method which comprises adding a given amount of the mineral oil type softening agent to olefinic copolymer rubber solution and then carrying out desolvation by steam stripping or the like. Of these methods, preferred is to use the olefinic copolymer rubber solution and olefinic copolymer rubber solution obtained by polymerization is more preferred for easiness of operation.

(v) The polyolefin resins (c) are polypropylene resin or copolymer resins of propylene and α-olefin having 2 or more carbon atoms. Examples of the α-olefin having 2 or more carbon atoms are ethylene, 1-butene, 1-pentene, 3-methyl-1-butene, 1-hexene, 1-decene, 3-methyl-1-pentene, 4-methyl-1-pentene and 1-octane.

Melt flow rate of these polyolefin resins is 0.1-100 g/10 min, preferably 0.5-50 g/10 min. If the melt flow rate is less than 0.1 g/10 min or more than 100 g/10 min, there are problems in processability.

Furthermore, if amount of polyolefin resin (c) is less than 5% by weight in the partially crosslinked product obtained by heat treating the oil-extended olefinic copolymer rubber (b) and a part or the whole of polyolefin resin (c) in the presence of an organic peroxide, flowability decreases resulting in bad appearance of molded products.

(vi) The organic peroxides used for partial crosslinking of the mixtures comprising oil-extended olefinic copolymer rubber (b) and a part or the whole of polyolefin resin (c) include, for example, 2,5-dimethyl-2,5-di(t-butylperoxy)hexane, 2,5-dimethyl-2,5-di(t-butylperoxy)hexyn-3, 1,3-bis(t-butylperoxyisopropyl)benzene, 1,1-di(t-butylperoxy)3,5,5-trimethylcyclohexane, 2,5-dimethyl-2,5-di(peroxybenzoyl)hexyn-3, and dicumyl peroxide. Among them, 2,5-dimethyl-2,5-di(t-butylperoxy)hexane is preferred for inhibition of odor and scorch).

Addition amount of the organic peroxide can be selected from the range of 0.005-2.0 parts by weight, preferably 0.01-0.6 part by weight per 100 parts by weight of total amount of oil-extended olefinic copolymer rubber (b) and polyolefin resin (c). If the amount is less than 0.005 part by weight, effect of crosslinking reaction is small and if it is more than 2.0 parts by weight, control of the reaction is difficult and besides, this is economically disadvantageous.

(vii) In preparation of partially crosslinked product of a mixture of oil-extended olefinic copolymer rubber (b) and a part or the whole of polyolefin resin (c), there may be added peroxide crosslinking aids such as N,N'-m-phenylenebismaleimide, toluylenebismaleimide, p-quinonedioxime, nitrobenzene, diphenylguanidine, and trimethylolpropane and polyfunctional vinyl monomers such as divinylbenzene, ethylene glycol dimethacrylate, polyethylene glycol dimethacrylate, trimethylolpropane trimethacrylate, and allyl methacrylate. Addition of such compounds brings about homogeneous and gentle crosslinking reaction and reaction between olefinic copolymer rubber and polyolefin resin, whereby mechanical properties can be improved.

Amount of peroxide crosslinking aids or polyfunctional vinyl monomers can be selected within the range of 0.01–4.0 parts by weight, preferably 0.05–2.0 parts by weight based on 100 parts by weight of total amount of the oil-extended olefinic copolymer rubber and the polyolefin resin. If it is less than 0.01 part by weight, the effect is exhibited with difficulty and addition of more than 4 parts by weight is uneconomical.

(viii) Mineral oil type softening agent (d) used in the second step, namely, step of mixing partially crosslinked product of oil-extended olefinic copolymer rubber (b) and a part or the whole of polyolefin resin (c) with hydrogenated block copolymer (a) and mineral oil type softening agent (d) includes paraffinic, naphthenic or aromatic petroleum fractions of high boiling point which are added for improvement of processability or mechanical properties. If amount of aromatic component increases, staining occurs much and this restricts uses as transparent or light-colored products.

This mineral oil type softening agent (d) may be the same as one used in the oil-extended olefinic copolymer rubber or may be different therefrom in viscosity.

(ix) Examples of antistatic agents (e) for polyolefins are as follows: ($\alpha$) cationic antistatic agents such as primary and tertiary amines, quaternary ammonium compounds, and pyridine derivatives, ($\beta$) anionic antistatic agents such as sulfated oils, soaps, sulfated ester oils, sulfated amide oils, sulfuric acid esters of olefins, fatty alcohol sulfuric acid esters, alkylsulfuric acid esters, fatty acid ethylsulfonates, alkylnaphthalenesulfonates, alkylbenzenesulfonates, succinic acid ester sulfonates, and phosphoric acid ester salts, ($\gamma$) nonionic antistatic agents such as partial fatty acid esters of polyhydric alcohols, ethylene oxide adducts with fatty alcohols, ethylene oxide adducts with fatty acids, ethylene oxide adducts with fatty amines or fatty amides, ethylene oxide adducts with alkylphenols, ethylene oxide adducts with alkylnapthols, ethylene oxide adducts with polyhydric alcohols, and polyethylene glycol, and ($\delta$) amphoteric antistatic agents such as carboxylic acid derivatives and imidazoline derivatives. Among them, noionic ones are preferred and especially preferred are polyoxyethylenealkylamines and polyoxyethylene alkylamides and fatty acid esters thereof and fatty acid esters of glycerine.

These antistatic agents may be used singly or as a mixture of two or more. They are added in an amount of about 0.03–2 parts by weight, preferably about 0 04–1 part by weight per 100 parts by weight of the thermoplastic elastomer composition of the present invention. If the amount is more than the above range, blooming to the surface and deterioration of properties of the thermoplastic elastomer occur.

Molded products which have high flexibility of less than 45 in Shore A hardness and furthermore which have no tackiness can be obtained by adding the antistatic agents.

Sticking of dusts reduces by inhibition of tackiness and bleeding of softening agent and simultaneously reduction of static chargeability which is inherent action of antistatic agents occurs and sticking of dusts due to static charging also decreases.

In some case, slipperiness of the surface of molded products is desired and for this purpose, higher fatty acid amides can be used together with the antistatic agents.

However, when it is attempted to obtain very flexible molded products of less than 45 in Shore A hardness from blends comprising hydrogenated block copolymer (a), polyolefin resin (c) and mineral oil type softening agent (d) without using the partially crosslinked product of olefinic copolymer rubber and polyolefin resin (c) as one component of the compositions, bleeding of the softening agent cannot be avoided even if antistatic agent (e) is added.

Even in the case of using a partially crosslinked product of olefinic copolymer rubber and polyolefin resin (b), if olefinic copolymer rubber having a Mooney viscosity ($ML_{1+4}$ 100° C.) of normal range of 10–120 is used, very flexible molded products of less than 45 in Shore A hardness which are superior in tackiness and mechanical strengths cannot be obtained.

Therefore, in order to obtain molded products for which consideration is given as to balancing of the properties, it is essential to use oil-extended olefinic copolymer rubber (b) containing 20–150 parts by weight of mineral oil type softening agent per 100 parts by weight of olefinic copolymer rubber having a Mooney viscosity ($ML_{1+4}$ 100° C.) of 150–350 as the olefinic copolymer rubber.

(x) Examples of higher fatty acid amide (f) are saturated fatty acid amides such as lauric acid amide, palmitic acid amide, stearic acid amide, and behenic acid amide, unsaturated fatty acid amides such as erucic acid amide, oleic acid amide, elaidic acid amide, and bisfatty acid amides such as methylenebisstearic acid amide, methylenebisoleic acid amide, ethylenebisstearic acid amide and ethylenebisoleic acid amide.

Especially preferred higher fatty acid amides are those which have a melting point of about 70° C.–about 110° C.

The higher fatty acid amide is added in an amount of about 0.03–about 2 parts by weight, preferably about 0.04–about 1 part by weight per 100 parts by weight of the thermoplastic elastomer composition of the present invention.

If amount is less than or more than the above range, blooming of the higher fatty acid amide and deterioration of properties of the thermoplastic elastomer occur.

(xi) Next, process for production of the thermoplastic elastomer (TPE) composition of the present invention will be specifically explained.

Production of the TPE composition of the present invention comprises the first step of preparing the partially crosslinked product and the second step of blending the resulting partially crosslinked product with other components.

In the first step, oil-extended olefinic copolymer rubber (b), a part or all of polyolefin resin (c), and organic peroxide and, if necessary, crosslinking aid and others are mixed at a specific ratio and the mixture is subjected to dynamic heat treatment. That is, the mixture is molten and kneaded. Known non-open type mixer, for example, Banbury mixer, twin-screw extruder and the like are used for mixing and kneading. The kneading may be carried out at 150°-300° C. for 0.5-30 minutes.

The mixing and kneading of oil-extended olefinic copolymer rubber (b), polyolefin resin (c), and an organic peroxide, etc, can be carried out preferably in the following manner. A mixture of oil-extended olefinic copolymer rubber (b) and a part or all of polyolefin resin (c) and, if necessary, crosslinking aid and others are blended at a given ratio and the blend is sufficiently kneaded and homogenized at 150°-250° C. using known non-open kneader such as Banbury mixer. The resulting composition is sufficiently blended with an organic peroxide by an internal mixer such as tumbler or super mixer. Then, the blend is dynamically heat treated at 200°-300° C. by twin-screw continuous extruder which can provide high kneading power to obtain the desired product.

Next, in the second step, the partially crosslinked product obtained in the first step is kneaded with the remainder components, namely, hydrogenated block copolymer (a), polyolefin resin (c) and mineral oil type softening agent (d). Twin-screw extruder, Banbury mixer, roll and the like are used for the kneading.

Furthermore, it is also possible to employ a method which comprises previously kneading the components other than the partially crosslinked product and dry blending this kneaded product with the partially crosslinked product as disclosed in Japanese Patent Kokoku No. 59-6236.

Moreover, antistatic agent (e) and/or higher fatty acid amide (f) may be added at any of the above steps. Besides, these may be added as a masterbach with polyolefin resin or may be deposited on the surface of final pellets by dry blending.

If necessary, the TPE composition of the present invention can further contain auxiliary materials such as inorganic fillers, antioxidants, weathering agents and colored pigments.

These auxiliary materials can be added at any stages of production of the composition or at the time of processing or at the time of using the processed products.

Uses of the elastomer compositions of the present invention include interior surface materials and packing materials for automobile parts such as instrument panels, door trims, center pillars, console boxes, glove compartments, arm rests, and steering wheel pads; skin materials of domestic appliance bodies, leg rubbers and packing materials for domestic appliances; grips of golf club, tennis rackets and badminton rackets for sports goods; daily necessaries; and toys.

The following nonlimiting examples will explain the present invention in more detail.

Test methods used for measurement of properties in the examples and comparative examples are as follows:

(1) Mooney viscosity ($ML_{1+4}$ 100° C.) (hereinafter referred to as "viscosity"):

This was measured in accordance with ASTMD-927-57T.

Viscosity ($ML_1$) of EPDM was calculated by the following formula:

$$\log\left(\frac{ML_1}{ML_2}\right) = 0.0066 \, (\Delta PHR)$$

$ML_1$: Viscosity of EPDM
$ML_2$: Viscosity of oil-extended EPDM
$\Delta PHR$: Oil-extension amount per 100 parts by weight of EPDM.

(2) Hardness: This was measured in accordance with ASTM D-2240 (Type A, instantaneous value).

(3) Stress at break: This was measured in accordance with JIS K-6301 (JIS-No. 3 dumbbell, stress rate: 200 mm/min).

(4) Elongation at break: Same as in (3).

(5) Permanent compression set: This was measured in accordance with JIS K-6301 (70° C. or 100° C., 22 Hr, compression rate: 25%).

(6) Appearance of injection molded product: FS-75N injection molding machine of Nissei Resin Co. was used.

Molding temperature: 220° C.; mold temperature: 50° C.; injection time: 10 seconds; cooling time: 30 seconds; injection pressure: minimum filling pressure necessary for complete filling in the mold +2.5 kg/cm$^2$; Shape of mold: 150 mm×90 mm×2 mm with a pin gate.

The appearance was graded by the following criteria:
○: Good appearance without flow marks, sink marks, and hard spot.
Δ: Some flow marks, sink marks and hard spots were seen.
X: Many flow marks, sink marks and hard spots were seen.

(7) Tackiness: The following two methods were employed for injection molded products.

(i) Touching by hand:
The products were touched directly by fingers and the results were graded in the following manner.
○: Good touch with no tackiness.
Δ: Some tackiness.
X: Considerable tackiness.

(ii) Peeling test:
Strip-shaped test pieces of 2×25×90 mm were punched from injection molded plates of 2×90×150 mm. After 3 days, two of these test pieces were brought into close contact with each other and applied with a load of 80 g/cm$^2$ and left to stand for 1 hour at room temperature. After removal of the load, the test pieces were subjected to T-peel test by a tensile tester at a rate of 500 mm/min and maximum strength at peeling was measured.

(8) Bleeding of softening agent:
Six disc-shaped test pieces of 29 mm$\phi$ were punched from an injection molded plate of 2×90×150 mm. These six discs were superposed with a commercially available copying paper of 50×50 mm being inserted between the third disc and the fourth disc. This sample was applied with a strain of 25% by a measuring jig (JIS K 6301) for permanent compression set and conditioned at 70° C. for 22 hours. Then, the copying paper was taken out and degree of bleeding of softening agent to the copying paper was observed and the results were graded by the following criteria.
○: Substantially no bleeding of softening aget was seen.
Δ: Some bleeding of softening agent was seen.

X: Much bleeding of softening agent was seen.

EXAMPLE 1

The first step:

To hexane solution of EPDM (hereinafter referred to as "EPDM-1") of viscosity: 242, propylene content: 28% and iodine value: 12 was added 100 parts by weight of DIANA PROCESS OIL PW380 manufactured by Idemitsu Kosan Co. (hereinafter referred to as "softening agent-1") as a mineral oil type softening agent per 100 parts by weight of EPDM and the mixture was desolvated by steam stripping to prepare oil-extended EPDM.

200 Parts by weight of the oil-extended EPDM, 25 parts by weight of propylene-butene copolymer (butene content: 23%, hereinafter referred to as "PP-1") having a melt flow rate of 3 (in accordance with JIS K 7210, 230° C.), and 2.5 parts by weight of N,N-m-methaphenilenebismaleimide were kneaded at 170°-200° C. for 7 minutes by Banbury mixer. Then, pelletized masterbatch was prepared therefrom by an extruder.

Thereafter, 0.32 part by weight of 2,5-dimethyl-2,5-di(t-butylperoxy)hexane (hereinafter referred to as "peroxide-1") was uniformly blended with 100 parts by weight of the above masterbatch by Henschel mixer.

This blend was subjected to dynamic heat treatment at 250° C.±10° C. for 70 seconds using a twin-screw kneading extruder which provides strong kneading power to obtain pellets.

The second step:

A block copolymer hereinafter referred to as "SEBS" having A-B-A structure comprising polystyrene block A of 31,000 in number average molecular weight and completely hydrogenated butadiene block B of 130,000 in number average molecular weight, the partially crosslinked product obtained in the first step, a propylene-ethylene random copolymer (ethylene content: 4.7%, hereinafter referred to as "PP-2") having a melt flow rate of 7, and DIANA PROCESS OIL PW 90 manufactured by Idemitsu Kosan Co. (hereinafter referred to as "softening agent-2") as a mineral oil type softening agent were kneaded at a ratio as shown in Table 1 by Banbury mixer and further pelletized by an extruder.

The resulting composition was injection molded and the injection molded products were evaluated on the properties. The results are shown in Table 1.

EXAMPLE 2

The first step: Same as the first step of Example 1 except that 30 parts by weight of a propylene homopolymer having a melt flow rate of 10 (hereinafter referred to as "PP-3") was used as a polyolefin resin.

The second step: Same as the second step of Example 1 except that the partially crosslinked product obtained in the first step, SEBS, PP-2, and softening agent-2 were kneaded at a ratio as shown in Table 1.

EXAMPLE 3

The first step: Same as the first step of Example 1.

The second step: Same as the second step of Example 1 except that 1.56 part by weight of stearyldiethanolamine monostearate (hereinafter referred to as "antistatic agent-1") and 0.78 part by weight of stearic acid monoglyceride (hereinafter referred to as "antistatic agent-2") were added per 100 parts by weight of SEBS at the time of kneading by Banbury mixer.

EXAMPLE 4

The first step: Same as the first step of Example 2.

The second step: Same as the second step of Example 2 except that 0.75 part by weight of antistatic agent-2 and 0.26 part by weight of erucic acid amide (hereinafter referred to as "lubricant-1") as a lubricant were added per 100 parts by weight of SEBS at the time of kneading by Banbury mixer.

EXAMPLE 5

The first step: Same as the first step of Example 1.

The second step: Same as the second step of Example 4 except that the ratio of the partially crosslinked product obtained in the first step, SEBS, PP-2, softening agent-2, antistatic agent-2, and lubricant-1 kneaded by Banbury mixer was as shown in Table 1.

EXAMPLE 6

The first step: Same as the first step of Example 1.

The second step: Same as the second step of Example 4 except that the ratio of the partially crosslinked product obtained in the first step, SEBS, PP-2, softening agent-2, antistatic agent-2, and lubricant-1 kneaded by Banbury mixer was as shown in Table 1.

The results of Examples 2-6 are shown in Table 1.

COMPARATIVE EXAMPLE 1

The first step: In place of the oil-extended EPDM used in Example 1, 100 parts by weight of oil-unextended EPDM (hereinafter referred to as "EPDM-2") of viscosity: 86, propylene content: 50%, and iodine value: 8 and 24 parts by weight of polypropylene homopolymer (hereinafter referred to as "PP-4") having a melt flow rate of 4 were kneaded as in Example 1 to obtain pelletized masterbatch.

This masterbatch was partially crosslinked in the same manner as in Example 1 and pelletized.

The second step: Same as the second step of Example 1 except that the partially crosslinked product obtained in the first step, SEBS, PP-2, and softening agent-2 were kneaded at a ratio as shown in Table 2 by the Banbury mixer.

COMPARATIVE EXAMPLE 2

The first step: Same as the first step of Comparative Example 1.

The second step: Same as the second step of Comparative Example 1 except that PP-3 was used in place of PP-2.

COMPARATIVE EXAMPLE 3

Example 1 was repeated except that 100 parts by weight of SEBS, 290 parts by weight of the same oil-extended EPDM as used in Example 1, 55 parts by weight of PP-2, 200 parts by weight of softening agent-1, and 6.5 parts by weight of crosslinking aid-1 were made into a pelletized masterbatch using a Banbury mixer and an extruder by the same method as in Example 1.

COMPARATIVE EXAMPLE 4

Example 1 was repeated except that 100 parts by weight of SEBS, 33 parts by weight of PP-2, 200 parts by weight of softening agent-2, and 0.67 part by weight of erucic acid amide were pelletized by a Banbury mixer and an extruder.

COMPARATIVE EXAMPLE 5

The first step: An oil-unextended EPDM having a viscosity of 77, a propylene content of 45%, and an iodine value of 22 (hereinafter referred to as "EPDM-3") in place of the oil-extended EPDM used in Example 1, a propylene-ethylene copolymer having a melt flow rate of 1.5, a density of 0.893 and an ethylene content of 4.7% (hereinafter referred to as "PP-5") as a polyolefin resin, BUTYL 365 (butyl rubber manufactured by Esso Chemical Co., degree of unsaturation: 2.0%; $ML_{1+4}$ 100° C.: 45) and softening agnet-2 as softening agent, 1,3-bis-(t-butyl-peroxyisopropyl)benzene (hereinafter referred to as "peroxide-2") as a peroxide, and divinylbenzene (hereinafter referred to as "crosslinking aid-2") as a crosslinking aid at a ratio as shown in Table 2 were subjected to dynamic heat treatment by a Banbury mixer (kneading temperature: 170°–200° C., kneading time: 7 minutes). The kneaded product was pelletized by an extruder.

The second step: Same as the second step of Example 1 except that ratio of the partially crosslinked product obtained in the first step, SEBS, PP-5, and softening agent-2 was as shown in Table 2.

COMPARATIVE EXAMPLE 6

The first step: Same as the first step of Comparative Example 5.

The second step: Same as the second step of Example 1 except that ratio of the partially crosslinked product obtained in the first step, SEBS, PP-5, and softening agent-2 was as shown in Table 2.

COMPARATIVE EXAMPLE 7

The first step: Same as the first step of Comparative Example 5.

The second step: Same as the second step of Example 1 except that ratio of the partially crosslinked product obtained in the first step, SEBS, PP-5, butyl rubber 365, and softening agent-2 was as shown in Table 2.

The results of Comparative Examples 1–7 are shown in Tables 2 and 3.

TABLE 1

| Example | 1 The 1st step | 1 The 2nd step | 2 The 1st step | 2 The 2nd step | 3 The 1st step | 3 The 2nd step | 4 The 1st step | 4 The 2nd step | 5 The 1st step | 5 The 2nd step | 6 The 1st step | 6 The 2nd step |
|---|---|---|---|---|---|---|---|---|---|---|---|---|
| SEBS | | 100 | | 100 | | 100 | | 100 | | 100 | | 100 |
| Oil-extended EPDM EPDM-1 | 114 | | 49 | | 114 | | 49 | | 60 | | 69 | |
| Softening agent-1 | 114 | | 49 | | 114 | | 49 | | 60 | | 69 | |
| PP-1 | 28 | | | | 28 | | | | 15 | | 17 | |
| PP-2 | | 10 | | | | 10 | | | | 13 | | 15 |
| PP-3 | | | 15 | 13 | | | 15 | 13 | | | | |
| Softening agent-2 | | 150 | | 150 | | 150 | | 150 | | 200 | | 250 |
| Peroxide-1 | 0.84 | | 0.36 | | 0.84 | | 0.36 | | 0.43 | | 0.50 | |
| Crosslinking aid-1 | 2.9 | | 1.2 | | 2.9 | | 1.2 | | 1.5 | | 1.7 | |
| Antistatic agent-1 | | | | | | 1.56 | | | | | | |
| Antistatic agent-2 | | | | | | 0.78 | | 0.75 | | 0.89 | | 1.0 |
| Lubricant-1 | | | | | | | | 0.26 | | 0.31 | | 0.36 |
| Kneading machine | Twin-screw extruder | Banbury mixer | Twin-screw extruder | Banbury mixer | Twin-screw extruder | Banbury mixer | Twin-screw extruder | Banbury mixer | Twin-screw extruder | Banbury mixer | Twin-screw extruder | Banbury mixer |
| Shore A hardness | | 37 | | 36 | | 37 | | 37 | | 27 | | 24 |
| Tensile Breaking strength ($Kg/cm^2$) | | 36 | | 38 | | 36 | | 38 | | 27 | | 25 |
| Elongation at break (%) | | 570 | | 630 | | 570 | | 630 | | 610 | | 630 |
| Permanent compression set 70° C. (%) | | 29 | | 27 | | 29 | | 27 | | 25 | | 24 |
| Permanent compression set 100° C. (%) | | 46 | | 47 | | 46 | | 47 | | 45 | | 46 |
| Appearance of injection molded product | | ○ | | ○ | | ○ | | ○ | | ○ | | ○ |
| Tackiness (touch with finger) | | Δ | | Δ | | ○ | | ○ | | ○ | | ○ |
| Tackiness peeling test (g/25 mm width) | | 130 | | 190 | | <10 | | <10 | | 10 | | 20 |
| Bleeding of softening agent | | no | | no | | no | | no | | no | | no |

TABLE 2

| Comparative Example | 1 The 1st step | 1 The 2nd step | 2 The 1st step | 2 The 2nd step | 3 | 4 |
|---|---|---|---|---|---|---|
| SEBS | | 100 | | 100 | 100 | 100 |
| Oil-extended EPDM-1 | | | | | 145 | |
| EPDM Softening agent-1 | | | | | 145 | |
| EPDM-2 | 127 | | 127 | | | |
| EPDM-3 | | | | | | |
| PP-2 | | 15 | | | 55 | 33 |
| PP-3 | | | | 15 | | |
| PP-4 | 30 | | 30 | | | |
| Softening agent-1 | | | | | 200 | |
| Softening agent-2 | | 250 | | 250 | | 200 |
| Peroxide-1 | 0.52 | | 0.52 | | 2.1 | |
| Crosslinking aid-1 | | | | | 6.5 | |
| Crosslinking aid-2 | | | | | | |
| Lubricant-1 | | | | | | 0.67 |
| Kneading machine | Twin-screw extruder | Banbury mixer | Twin-screw extruder | Banbury mixer | Twin-screw extruder | Banbury mixer |
| Shore A hardness | | 36 | | 37 | 38 | 37 |
| Tensile Breaking strength (Kg/cm$^2$) | | 18 | | 17 | 36 | 28 |
| Elongation at break (%) | | 560 | | 530 | 440 | 770 |
| Permanent compression set 70° C. (%) | | 32 | | 36 | 34 | 32 |
| Permanent compression set 100° C. (%) | | 47 | | 49 | 41 | 56 |
| Appearance of injection molded product | | ◯ | | ◯ | ◯ | ◯ |
| Tackiness by touching with finger | | X | | X | X | ◯ |
| Tackiness, Peeling test (g/25 mm width) | | 330 | | 390 | 280 | <10 |
| Bleeding of softening agent | | no | | no | no | Occurred |

TABLE 3

| Comparative Example | 5 The 1st step | 5 The 2nd step | 6 The 1st step | 6 The 2nd step | 7 The 1st step | 7 The 2nd step |
|---|---|---|---|---|---|---|
| SEBS | | 74 | | 100 | | 100 |
| Oil-extended EPDM-1 | | | | | | |
| EPDM Softening agent-1 | | | | | | |
| EPDM-3 | 55 | | 55 | | 55 | |
| Butyl rubber 365 | 5 | | 5 | | 5 | 100 |
| PP-5 | 20 | 10 | 20 | 26 | 20 | 20 |
| Softening agent-1 | | | | | | |
| Softening agent-2 | 20 | 148 | 20 | 200 | 20 | 100 |
| Peroxide-2 | 0.3 | | 0.3 | | 0.3 | |
| Crosslinking aid-1 | | | | | | |
| Crosslinking aid-2 | 0.5 | | 0.5 | | 0.5 | |
| Lubricant-1 | | | | | | |
| Kneading machine | Banbury mixer | Banbury mixer | Banbury mixer | Banbury mixer | Banbury mixer | Banbury mixer |
| Shore A hardness | | 36 | | 37 | | 38 |
| Tensile Breaking strength (Kg/cm$^2$) | | 19 | | 29 | | 17 |
| Elongation at break (%) | | 430 | | 450 | | 290 |
| Permanent compression set 70° C. (%) | | 34 | | 30 | | 47 |
| Permanent compression set 100° C. (%) | | 46 | | 52 | | 65 |
| Appearance of injection molded product | | ◯ | | ◯ | | ◯ |
| Tackiness by touching with finger | | X | | X | | X |
| Tackiness, Peeling text (g/25 mm width) | | 350 | | 250 | | 1420 |
| Bleeding of softening agent | | no | | no | | no |

According to the present invention, materials can be provided which are very flexible as thermoplastic elastomer and have a Shore A hardness of less than 45, are free from the problems such as tackiness and bleeding of sogtening agents, and besides are excellent in mechanical strengths, heat resistance, rubber elasticity, and processability.

We claim:

1. A thermoplastic elastomer composition which has a Shore A hardness of less than 45 and which comprises:

(a) 100 parts by weight of a selectively hydrogenated block copolymer which has a structure having at least two terminal polymer blocks A comprising an aromatic monoalkenyl or monoalkenylidene hydrocarbon polymer of 5,000–125,000 in number average molecular weight and at least one intermediate polymer block B comprising a partially or completely hydrogenated aliphatic conjugated diene hydrocarbon polymer of 10,000–800,000 in number average molecular weight, (b) 50–400 parts by weight of an oil-extended olefinic copolymer rubber comprising 100 parts by weight of an olefinic copolymer rubber having a 100° C. Mooney viscosity ($ML_{1+4}$ 100° C.) of 150–350 and 20–150 parts by weight of a mineral oil type softening agent, (c) 2–100 parts by weight of a polyolefin resin, and (d) 50–350 parts by weight of a mineral oil type softening agent, said composition being prepared by heat treating a mixture comprising at least a total amount of the component (b) and a part or a total amount of the component (c) among the components (b)–(d) in the presence of an organic peroxide to partially crosslink the mixture and then, blending the resulting partially crosslinked product with the component (a) and the remainder components.

2. A thermoplastic elastomer composition according to claim 1, which additionally contains (e) 0.03–2 parts by weight of an antistatic agent for polyolefin per 100 parts by weight of the composition.

3. A thermoplastic elastomer composition according to claim 1, which additionally contains (f) 0.003–2 parts by weight of a higher fatty acid amide per 100 parts by weight of the composition.

4. A thermoplastic elastomer composition according to claim 1, which additionally contains (e) 0.03–2 parts by weight of an antistatic agent for polyolefin and (f) 0.03–2 parts by weight of a higher fatty acid amide per 100 parts by weight of the composition.

5. A thermoplastic elastomeric composition according to claim 1, 2, 3 or 4, wherein the polyolefin resin (c) is a polypropylene resin or a propylene-α-olefin copolymer resin.

6. A thermoplastic elastomeric composition according to claim 1, 2, 3 or 4, wherein the mineral oil type softening agent (d) is a paraffinic softening agent.

* * * * *